May 26, 1959   E. T. ARMSTRONG   2,888,103
DISC TYPE BRAKE WITH LOAD EQUALIZING PRESSURE APPLYING MEMBERS
Filed Dec. 11, 1956   4 Sheets-Sheet 1

*INVENTOR.*
EDWARD T. ARMSTRONG
BY
*R. L. Miller*
ATTORNEY

May 26, 1959 E. T. ARMSTRONG 2,888,103
DISC TYPE BRAKE WITH LOAD EQUALIZING PRESSURE APPLYING MEMBERS
Filed Dec. 11, 1956 4 Sheets-Sheet 2

INVENTOR.
EDWARD T. ARMSTRONG
BY
ATTORNEY

May 26, 1959 E. T. ARMSTRONG 2,888,103
DISC TYPE BRAKE WITH LOAD EQUALIZING PRESSURE APPLYING MEMBERS
Filed Dec. 11, 1956 4 Sheets-Sheet 3

INVENTOR.
EDWARD T. ARMSTRONG
BY
R. L. Miller
ATTORNEY

May 26, 1959 E. T. ARMSTRONG 2,888,103
DISC TYPE BRAKE WITH LOAD EQUALIZING PRESSURE APPLYING MEMBERS
Filed Dec. 11, 1956 4 Sheets-Sheet 4

INVENTOR.
EDWARD T. ARMSTRONG
BY
ATTORNEY

United States Patent Office 2,888,103
Patented May 26, 1959

2,888,103

DISC TYPE BRAKE WITH LOAD EQUALIZING PRESSURE APPLYING MEMBERS

Edward T. Armstrong, Butler, N.J., assignor to The Goodyear Tire & Rubber Company, Akron, Ohio, a corporation of Ohio Application December 11, 1956, Serial No. 627,684

5 Claims. (Cl. 188—72)

This invention relates to brakes of the disc type and is especially useful in relation to brakes for aircraft. The invention may be applied to either single disc or multiple disc brakes.

It has been proposed, heretofore, especially in the field of multiple disc brakes, to employ a single annular piston operated by an annular cylinder concentric with the wheel and brake to apply braking pressure to a disc or a stack of discs. It has been found that the resulting pressure distribution in such devices has been quite non-uniform. This has resulted in excessive wear, reduced capacity and objectionable fading.

It is an object of the present invention to provide for more uniform loading of the brake discs.

Another object is to provide more uniform wear of the brake.

Other objects are to restrict flow of heat from the brakes to the brake operating hydraulic fluid, to equalize pressure, to provide accommodation to worn or distorted brake discs by automatic adjustment thereto, and to provide a superior brake.

These and other objects will appear from the following description and the accompanying drawings:

Figure 1:
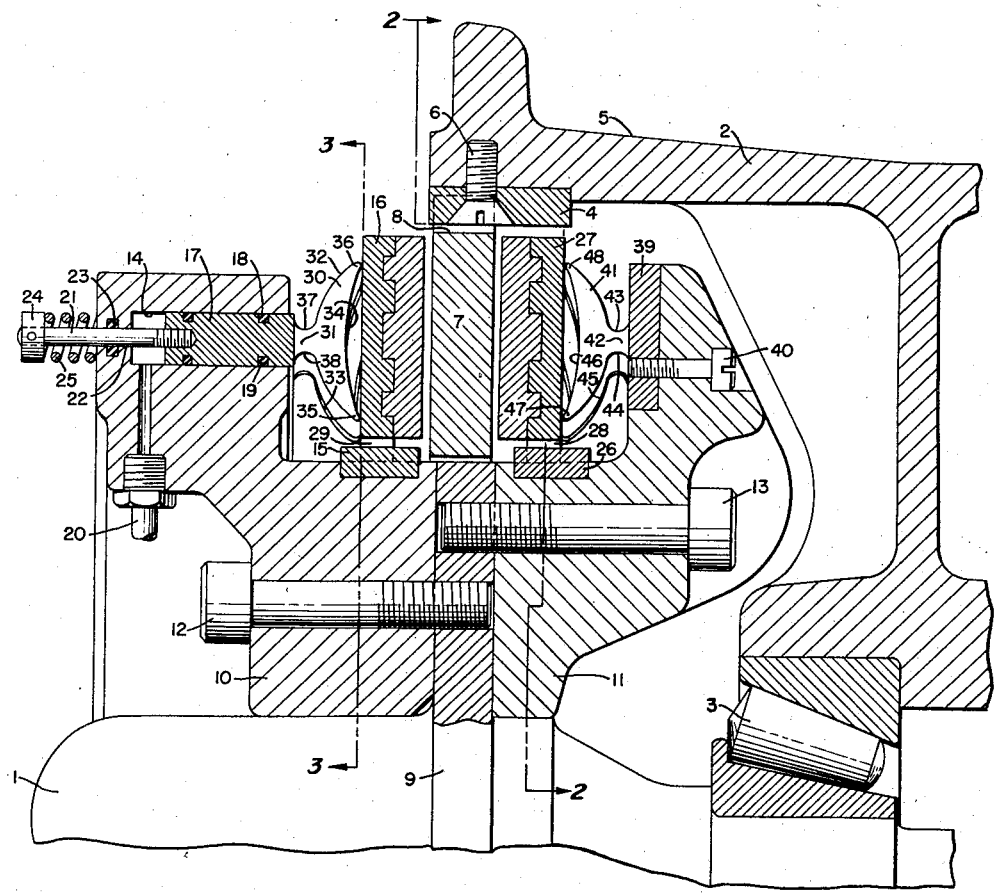
Fig. 1 is an axial sectional view of a single disc brake and wheel assembly embodying the invention, parts of the axle and wheel being broken away.
Figure 2:
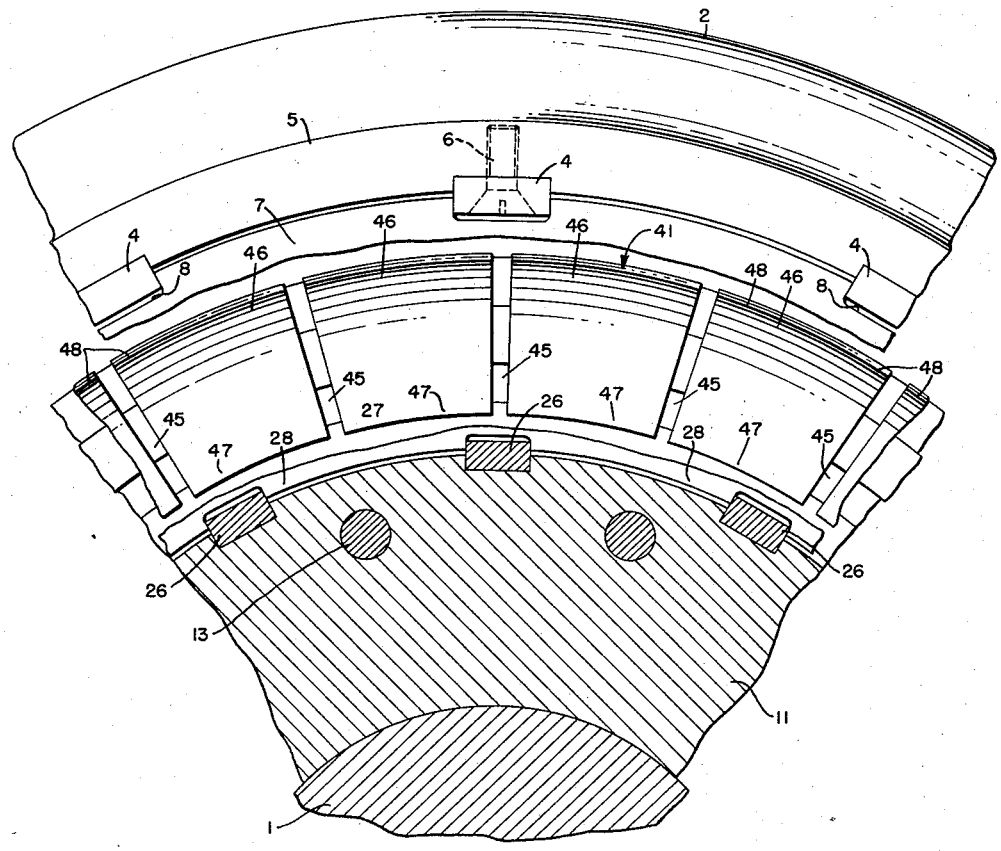
Fig. 2 is a sectional view taken on line 2—2 of Fig. 1, parts being broken away.
Figure 3:
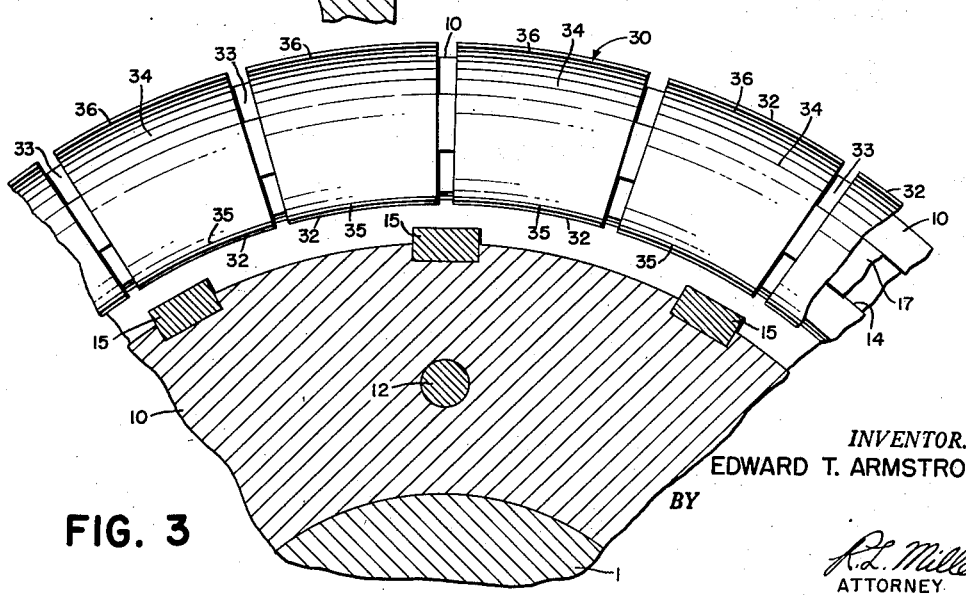
Fig. 3 is a sectional view taken on line 3—3 of Fig. 1.

Referring to the drawings, and first to Figs. 1 to 3 inclusive, the numeral 1 designates a non-rotatable axle about which a wheel 2 is mounted for free rotation about bearings such as 3. The wheel 2 carries a plurality of keys 4 at intervals about its rim 5 and secured in keyways in the inner face of the rim by screws 6.

A rotating brake disc 7 is provided with outer peripheral notches 8 to engage over the keys 4 whereby the disc must rotate with the wheel but may float axially thereof.

A flange 9 is provided integral with the axle, to which are secured an annular brake cylinder support 10 at one side thereof and an annular reaction ring support 11 at the opposite side thereof secured thereto by screws 12 and 13 respectively. The brake cylinder support 10 is formed with an annular cylinder 14 concentric with the shaft and opening toward the disc 7. The support 10 is also provided with spaced keys or splines 15 thereabout for retaining a brake disc 16 against rotation. An annular piston 17 is fitted in the cylinder 14 and is sealed thereto by annular sealing rings 18, 19.

A hydraulic pressure fluid connection 20 is provided to the cylinder 14 and a series of return spring rods 21 are secured to the piston 17 at spaced intervals and extend through openings 22 in the cylinder head wall to which they are sealed by sealing rings 23. Stop collars 24 are secured to the outer ends of rods 21 and return springs 25 are mounted between the collars 24 and the cylinder head wall about the rods for returning the piston when the braking pressure is released.

The reaction ring support 11 is also provided with serrations or keys 26 for retaining a disc 27 against rotation, the disc being formed with lugs 28 about its inner periphery to engage said keys. Similar lugs 29 on the disc 16 engage the keys 15 to retain the disc 16 against rotation.

To provide for distribution of pressure to the disc 16 from the piston 17 uniformly across the face of the disc despite warping or wear of the disc, the annular piston 17 is provided with an equalizing load-transfer portion 30 radially wider than the piston 17 and separated therefrom by a neck 31 of restricted thickness. The load transfer portion 30 is circumferentially divided into a series of pressure pads 32 by equally spaced radial slots 33. The pressure applying face 34 of this load transfer portion 30 is made concave radially to provide a pair of annular ridges 35, 36 at the inner and outer margins of the pressure pads for contact with the disc 16, the spacing of the ridges 35, 36 being arranged to support the disc with the least distortion of the disc, the separation of the pressure transfer portion into segmented pressure pads and the provision of the narrow connecting neck 31, permitting the pressure pads to rock independently to a degree permitted by the flexibility of the neck portion while the radially spaced ridges 35, 36 permit flexing of the pressure pads without materially changing their two line contact with the brake disc.

The narrow connecting neck 31 is defined by concave grooves 37, 38 which are preferably of hyperbolic cross-section and provides a flexible hinge having no sliding parts and depending upon the elasticity and flexibility of the material. This neck also acts as a dam to retard flow of heat thereacross from the brake to the brake cylinder.

For transferring the reaction pressure to the opposite brake disc 27 from the reaction ring support 11, a reaction ring 39 is mounted thereon and held by screws 40. The ring 39 has a radially widened load transfer portion 41 spaced from the base portion of the ring 39 by a narrow neck 42 defined by concave preferably hyperbolic grooves 43, 44. The load transfer portion 41 is divided through the neck portion by radial slots 45 to provide spaced pressure pads 46 each having a radially concave face terminating in annular pressure transmitting ridges 47, 48 at their inner and outer margins for contacting the disc 27. This radial slotting of loading ring reduces its behavior as a rigid ring in torsion. The slots are preferably about ⅛ inch wide.

Figure 7:
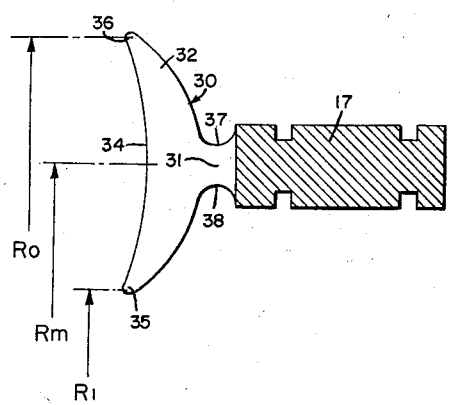
Fig. 7 is a cross-sectional view thereof.
Figures 5, 6:
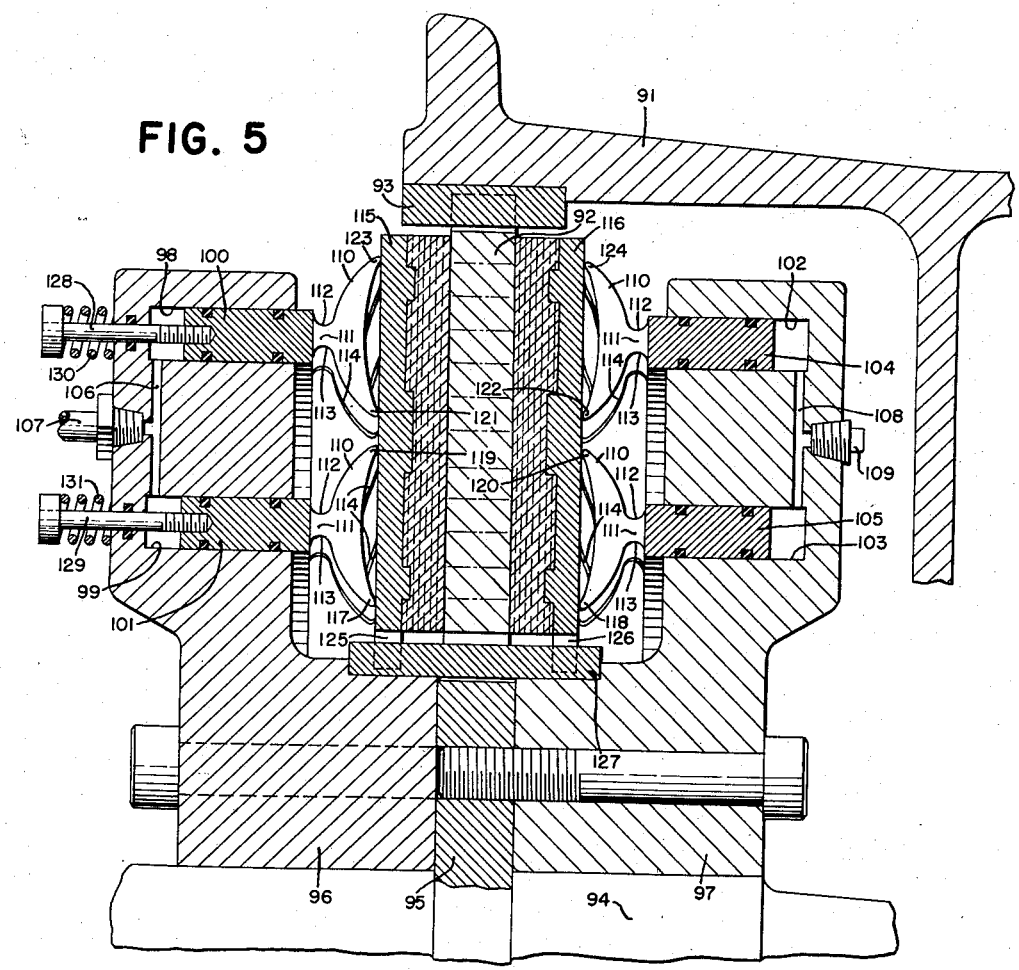
Fig. 5 is an axial sectional view of a single disc brake having a plurality of pressure applying pistons and a plurality of pressure backing supports.
Fig. 6 is an elevational view of a portion of the piston.

In the construction of the brake according to the invention, the mean radius of the annular piston should be equal to the geometric mean radius corresponding to a ring about which the internal and external areas balance. As indicated in Figs. 6 and 7, if $R_0$ is the radius at the outer ridge 36 and $R_1$ is the radius at the inner ridge 35, then $Rm$ the radius to the center line of the cylinder is:

$$Rm = \sqrt{\frac{R^2_0 + R^2_1}{2}}$$

Then the load on each loading ridge 35, 36 or 47, 48 will be in proportion to the area to be loaded. The ridges should be so placed radially as to balance the stiffness against deflection of the inner and outer peripheral margins of the brake discs with the stiffness against deflection thereof at their centers. It has been found where the radial contact or swept width of the brake discs equals W/1, the span of the contact ridges 35, 36 or 47, 48 should be ⅔W, approximately centered in the swept surface.

Figure 4:
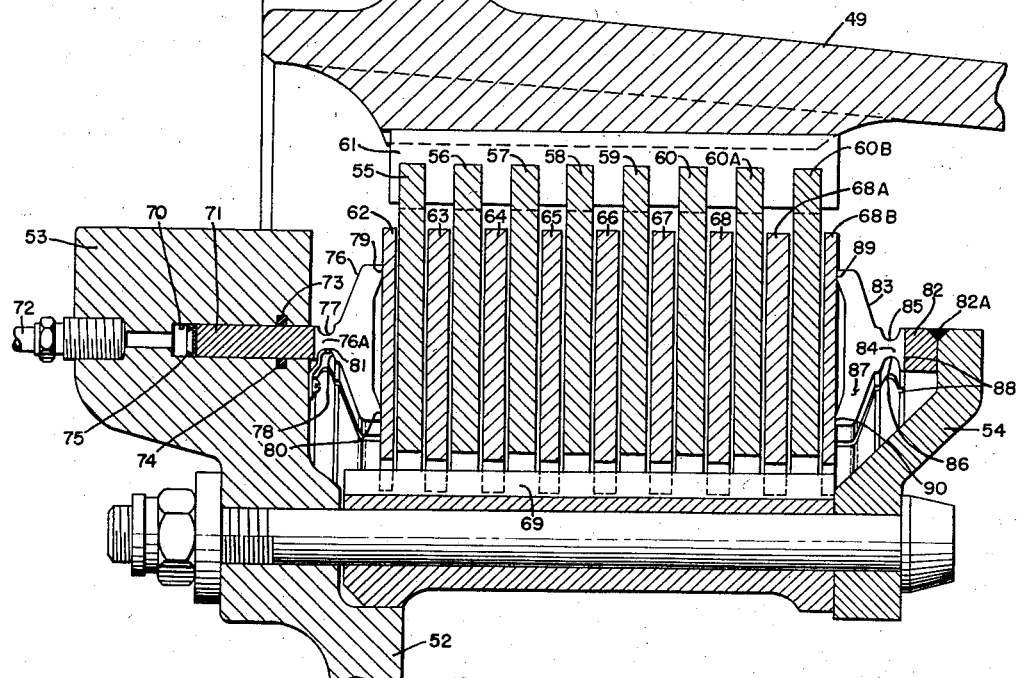
Fig. 4 is an axial sectional view of a multiple disc brake embodying the invention, parts of the axle and wheel being shown and parts broken away.

The invention is particularly useful in multiple disc brakes, especially in multiple disc brakes where the discs are relatively thin as in so-called Trimetallic brakes where one set of discs are of thin sheet metal coated on their radial faces with a sintered layer of powdered metals and the other set of discs are plain steel plates. In the modification of the invention shown in Fig. 4, the wheel 49 is mounted on bearings to rotate freely about a shaft not shown. A flange 52 of the shaft supports the annular cylinder member 53 and the annular reaction member 54.

A plurality of brake discs 55, 56, 57, 58, 59, 60, 60A and 60b are carried by the wheel 49, keys 61 carried by the wheel engaging in outer peripheral notches of the discs. The discs 55 to 60b are preferably of the sintered coated type.

A second set of discs 62, 63, 64, 65, 66, 67, 68, 68a and 68b are interleaved with the rotatable discs and have lugs at their inner peripheries for engaging keys 69 carried by the cylinder and reaction supports 53, 54 at spaced positions thereabout.

The cylinder support 53 is formed with an annular cylinder 70 in which an annular piston 71 is fitted for axial movement. Hydraulic brake operating fluid may be admitted to the cylinder through a connection 72. The piston is sealed by ring seals 73, 74 and also by an annular lip gasket 75.

A pressure distribution ring 76 of radial span equal to two thirds the swept brake width and separated from the annular piston 71 by a narrow neck 76a defined by concave grooves 77, 78 preferably of hyperbolic form is formed integral with the piston. It is partially radially slotted at intervals to divide it into spaced pressure pads hinged to the annular piston by the narrow neck portion 76a. The pressure applying faces of the pressure pads are concave in a radial plane, so as to provide a pair of annular ridges 79, 80 at their inner and outer peripheries for contacting the outer disc or pressure plate of the brake.

Leaf springs 81 are provided at intervals about the annular piston for returning it.

A reaction pressure distributing ring 82 is mounted on the support 54 as by a weld 82a for contacting the outermost disc 68b of the brake. It has a pressure distributing portion 83 separated from the ring by a narrow neck 84 defined by concave grooves 85, 86 and of width equal to two-thirds the radial contact width of the brake discs. The pressure distributing portion is divided into sectoral pressure pads 87 by radial grooves 88. The pads 87 have inner and outer marginal arcuate ridges 89, 90 for contacting the disc 68b the face of the pad therebetween being of concave shape.

Where the brake discs are of great radial extent, it may be advisable to provide more than one pressure distributing ring structure at each side of the brake. In Fig. 5, the wheel 91 supports a brake disc 92 by means of keys 93 engaging outer peripheral notches of the disc. A stationary shaft 94 has a flange 95 to which are secured a pair of opposed brake cylinder supports 96, 97. Support 96 is formed with a pair of concentric annular cylinders 98, 99. Annular pistons 100 and 101 are mounted in these cylinders. The opposed support 97 has a similar pair of concentric cylinders 102, 103 in which a pair of pistons 104, 105 are mounted. Cylinders 98 and 99 are connected by a passage 106 which may be supplied with fluid under pressure through connection 107. Likewise, cylinders 102, 103 are connected by a passage 108 and may be supplied with fluid through an opening closed by a plug 109.

Each of the pistons 100, 101, 104 and 105 is formed with a radial wider pressure portion such as 110 carried by a narrow neck portion 111 defined by concave grooves 112, 113. Each has the portion radially divided by grooves 114, to provide a series of pressure pads. The faces of the pads are recessed leaving pressure applying annular ridges at their inner and outer peripheries. The pressure distributing portions of pistons 100 and 101 engage a brake disc 115 at one side of disc 92 and the pressure portions of pistons 104, 105 engage a brake disc 116 at the opposite side of disc 92.

In order to distribute the braking pressure over the brake surfaces with minimum distortion of the discs, the brake disc contacting ridges of the pistons are so arranged that with the swept radial width of the brake disc divided into twelve equal spaces, the ridges 117, 118 will contact the brake discs between the first and second spaces, the ridges 119, 120 between the fifth and sixth spaces, the ridges 121, 122 between the seventh and eighth spaces, and the ridges 123, 124 between the eleventh and twelfth spaces.

The brake discs 115 and 116 have lugs 125, 126 respectively at their inner peripheries for engaging keys 127 carried by supports 96, 97 to prevent rotation of the discs. Return spring rods 128, 129 are mounted on pistons 100, 101 respectively and cooperate with return springs 130, 131 as in the form of the invention of Fig. 1. The connection 106 between cylinders 98, 99 serves as a load equalizer. The cylinders 102, 103 and the connection 108 serve to equalize the reaction load. These pistons need no return springs, and their cylinders may be partially filled with liquid shut off from the supply by plug 109 but providing for equalizing of the reaction load. Of course, the cylinder 102, 103 may be connected to the brake fluid pressure supply if desired and operated as brake applying cylinders.

In any of the forms of the invention, all of the brake discs are free to float axially by a limited amount with one disc or set of discs rotatable with the wheel and the other set of discs non-rotatably restricted. When braking pressure is applied to the pistons, their separated pressure distributing pads may act as beams loaded at one side at their ends and at the other side intermediate thereof, flexibility for adjustment to the load being provided by the narrow connecting portion to the operating pistons.

Also, the load is applied to the brake discs so as to cause the least distortion of the discs while the pads adjust to any distortion of the discs. Furthermore, the narrow necks connecting the pads to the pistons act as heat dams to prevent heating of the brake operating fluid.

Thus, it will be seen that the objects of the invention have been accomplished.

While certain representative embodiments and details have been shown for the purpose of illustrating the invention, it will be apparent to those skilled in the art that various changes and modifications may be made therein without departing from the spirit or scope of the invention.

What is claimed is:

1. A disc type brake comprising at least one rotatable disc and non-rotatable discs cooperative therewith, an annular cylinder and piston means for applying braking pressure axially to said discs, and an annular reaction member for backing said discs, at least one of said piston means and reaction members comprising an annular pressure transfer member integral therewith and supported at its geometrical mean radius by a narrow flexible neck axially remote from the discs to equalize pressure on the discs, said annular pressure transfer member being radially divided by slots extending to said neck to provide a series of independently movable pads each integral with said neck for contacting a brake disc.

2. A disc type brake comprising at least one rotatable disc and non-rotatable discs cooperative therewith, an annular cylinder and piston means for applying braking pressure axially to said discs, and an annular reaction member for backing said discs, at least one of said piston means and reaction members comprising an annular pressure transfer member integral therewith and supported at its geometrical mean radius by a narrow flexible neck axially remote from the discs to equalize pressure on the discs, said annular pressure transfer member being radially divided by slots extending to said neck to provide a series of independently movable pads each integral with said neck for contacting a brake disc and having a radially concave face terminating in inner and outer peripheral ridges for contacting a brake disc.

3. A disc type brake comprising at least one rotatable disc and non-rotatable discs cooperative therewith, an annular cylinder and piston means for applying braking pressure axially to said discs, and an annular reaction member for backing said discs, at least one of said piston means and reaction members comprising an annular pressure transfer member having a radially extensive pressure-applying face portion for transmitting pressure to said brake discs, said face portion being supported at its geometrical mean radius by a narrow flexible neck axially remote from the discs of less radial width than said face portion, said annular pressure transfer member having its pressure-applying face portion radially divided by slots extending through the face portion through said neck to provide a series of independently movable pads for contacting a brake disc and said annular pressure applying face of the transfer member having a radial width equal to two-thirds of the swept radial width of the brake disc.

4. A disc type brake comprising at least one rotatable disc and non-rotatable discs cooperative therewith, an annular cylinder and piston means for applying braking pressure axially to said discs, and an annular reaction member for backing said discs, at least one of said piston means and reaction members comprising an annular pressure transfer member having a radially extensive annular pressure-applying face portion, said face portion being radially divided by slots, said face portion being supported at its geometrical mean radius by a narrow flexible neck axially remote from the discs comprising a rocking fulcrum and said slots extending to said neck to equalize pressure on the discs, said annular pressure transfer member having a radially concave face terminating in inner and outer peripheral ridges for contacting a brake disc and said ridges being radially spaced at two-thirds the radial swept width of the brake discs.

5. A disc type brake comprising at least one rotatable disc and non-rotatable discs cooperating therewith, annular cylinder and piston means for applying braking pressure axially of said discs, annular reaction means for opposing said cylinder and pressure means, and load transfer means on said piston means and said reaction means opposed to said discs, said load transfer means comprising a radially broad annular support having radial slots extending therethrough and defining therebetween a series of pressure pads integral therewith and supported therefrom by a narrow flexible neck portion, said slots extending through said support to said neck portion permitting independent flexure, each pad having bearing ridges at its radially inner and outer margins for transmission of pressure, said ridges being radially spaced by two-thirds of the radial swept width of the brake discs.

References Cited in the file of this patent

UNITED STATES PATENTS

| | | |
|---|---|---|
| 2,289,094 | Black et al. | July 7, 1942 |
| 2,384,297 | Goepfrich | Sept. 4, 1945 |
| 2,453,237 | LeTourneau | Nov. 9, 1948 |

FOREIGN PATENTS

| | | |
|---|---|---|
| 201,668 | Australia | Apr. 20, 1956 |
| 873,945 | Germany | Apr. 20, 1953 |
| 735,748 | Great Britain | Aug. 24, 1955 |